United States Patent
Mitsui et al.

(10) Patent No.: US 10,524,253 B2
(45) Date of Patent: Dec. 31, 2019

(54) NETWORK APPARATUS AND BASE STATION

(71) Applicant: KYOCERA CORPORATION, Kyoto (JP)

(72) Inventors: Katsuhiro Mitsui, Ritto (JP); Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/573,102

(22) PCT Filed: May 10, 2016

(86) PCT No.: PCT/JP2016/063890
§ 371 (c)(1),
(2) Date: Nov. 9, 2017

(87) PCT Pub. No.: WO2016/185946
PCT Pub. Date: Nov. 24, 2016

(65) Prior Publication Data
US 2018/0146475 A1    May 24, 2018

(30) Foreign Application Priority Data

May 15, 2015    (JP) .................................. 2015-100130

(51) Int. Cl.
*H04W 72/04*    (2009.01)
*H04W 16/32*    (2009.01)
(Continued)

(52) U.S. Cl.
CPC ......... *H04W 72/0426* (2013.01); *H04W 8/24* (2013.01); *H04W 16/32* (2013.01);
(Continued)

(58) Field of Classification Search
CPC . H04W 88/02; H04W 72/0426; H04W 76/15; H04W 76/27; H04W 40/12; H04W 72/04
See application file for complete search history.

(56) References Cited

U.S. PATENT DOCUMENTS

| | | | |
|---|---|---|---|
| 9,320,016 B2* | 4/2016 | Maeda | H04W 28/0205 |
| 2010/0074129 A1* | 3/2010 | Wang | H04W 36/0055 370/252 |

(Continued)

FOREIGN PATENT DOCUMENTS

| | | |
|---|---|---|
| CN | 104185227 A | 12/2014 |
| EP | 2 723 124 A2 | 4/2014 |

(Continued)

OTHER PUBLICATIONS

International Search Report issued in PCT/JP2016/063890; dated Aug. 9, 2016.

(Continued)

*Primary Examiner* — Chi H Pham
*Assistant Examiner* — Fahmida S Chowdhury
(74) *Attorney, Agent, or Firm* — Studebaker & Brackett PC

(57) ABSTRACT

In a dual connectivity, the X2-GW collects operation information from a plurality of HeNBs. The X2-GW obtains a measurement result of radio quality reported by the UE to the MeNB from the MeNB. Based on the operation information of the HeNB and the measurement result, the X2-GW identifies transmission destination of a SeNB addition request message received from the MeNB, and sends the SeNB addition request message to the identified HeNB. Upon acquiring an acknowledgment message for the SeNB addition request message from the HeNB, the X2-GW sends the message to the MeNB.

13 Claims, 11 Drawing Sheets

(51) Int. Cl.
*H04W 92/20* (2009.01)
*H04W 76/15* (2018.01)
*H04W 76/27* (2018.01)
*H04W 8/24* (2009.01)
*H04W 40/12* (2009.01)
*H04W 88/02* (2009.01)
*H04W 88/10* (2009.01)
*H04W 48/16* (2009.01)

(52) U.S. Cl.
CPC ........... *H04W 40/12* (2013.01); *H04W 72/04* (2013.01); *H04W 76/15* (2018.02); *H04W 76/27* (2018.02); *H04W 92/20* (2013.01); *H04W 48/16* (2013.01); *H04W 88/02* (2013.01); *H04W 88/10* (2013.01)

(56) References Cited

U.S. PATENT DOCUMENTS

| | | | | |
|---|---|---|---|---|
| 2012/0058792 | A1* | 3/2012 | Liang | H04W 48/06 455/509 |
| 2012/0100851 | A1* | 4/2012 | Zheng | H04W 36/0094 455/436 |
| 2012/0230296 | A1* | 9/2012 | Hapsari | H04W 36/0038 370/331 |
| 2012/0295625 | A1* | 11/2012 | Matsuo | H04W 48/08 455/438 |
| 2013/0083773 | A1* | 4/2013 | Watfa | H04W 36/0033 370/331 |
| 2013/0301509 | A1* | 11/2013 | Purnadi | H04L 65/4076 370/312 |
| 2014/0133383 | A1* | 5/2014 | Park | H04L 12/185 370/312 |
| 2015/0023320 | A1 | 1/2015 | Inakoshi et al. | |
| 2015/0140965 | A1* | 5/2015 | Qiang | H04L 12/1407 455/410 |
| 2016/0029376 | A1 | 1/2016 | Fukuta et al. | |
| 2016/0183195 | A1* | 6/2016 | Gao | H04W 52/146 455/522 |
| 2016/0286449 | A1 | 9/2016 | Choi et al. | |
| 2017/0048692 | A1 | 2/2017 | Huang et al. | |
| 2017/0339671 | A1* | 11/2017 | Lee | H04W 72/12 |
| 2017/0374545 | A1* | 12/2017 | Masini | H04W 48/16 |

FOREIGN PATENT DOCUMENTS

| | | |
|---|---|---|
| WO | 2013/141086 A1 | 9/2013 |
| WO | 2014/148874 A1 | 9/2014 |
| WO | 2014/163143 A1 | 10/2014 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); 3GPP TS 36.300 V12.4.0; Dec. 2014; pp. 1-251; Release 12; 3GPP Organizational Partners.

Ericsson; "Open Issues on Support of CSG for DC"; 3GPP TSG-RAN WG3 Meeting #87bis; R3-150751; Apr. 20-24, 2015; pp. 1-21; Tenerife—Santa Cruz.

* cited by examiner

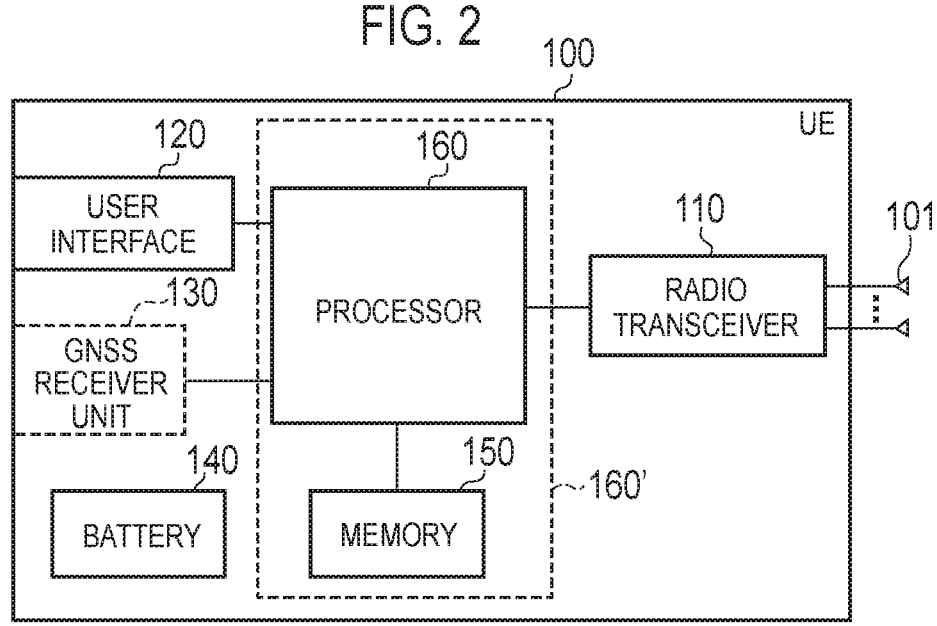
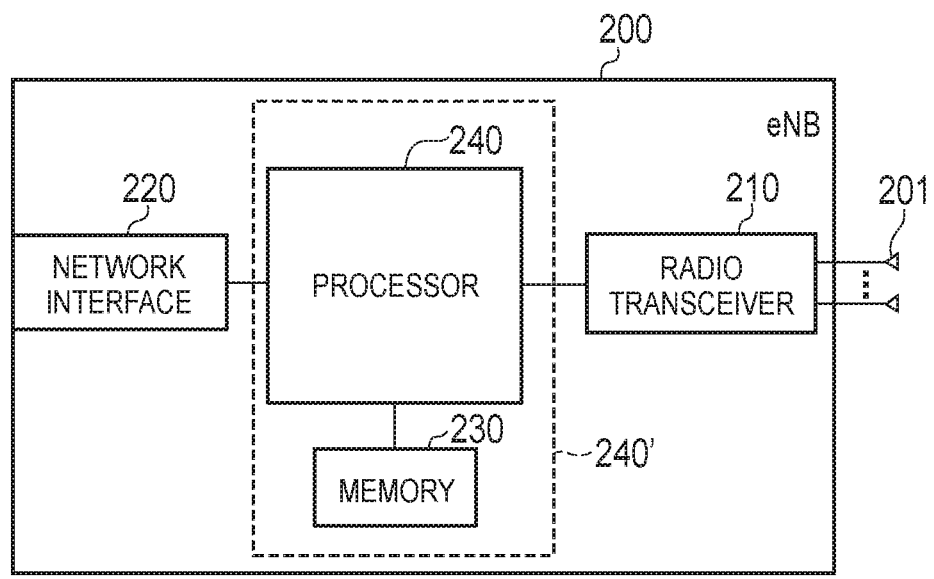

NETWORK APPARATUS AND BASE STATION

TECHNICAL FIELD

The present application relates to a network apparatus and a base station in a mobile communication system configured to support dual connectivity.

BACKGROUND ART

In 3GPP (3rd Generation Partnership Project) which is a project aiming to standardize a mobile communication system, introduction of dual connectivity has been discussed (see Non Patent Document 1).

In the dual connectivity, a user terminal simultaneously establishes a connection with a plurality of cells. In this case, each cell is managed by different base stations respectively.

In the dual connectivity, of the plurality of base stations configured to establish a connection with the user terminal, only one base station (hereinafter, called "master base station") establishes an RRC connection with the user terminal. On the other hand, of the plurality of base stations, another base station (hereinafter, "secondary base station") provides an additional radio resource to the user terminal without establishing the RRC connection with the user terminal.

PRIOR ART DOCUMENT

Non-Patent Document

Non Patent Document 1: 3GPP Technical Specification "TS36.300 v12.4.0" December, 2014

SUMMARY

A network apparatus according to embodiments is used in a mobile communication system capable of executing communication by dual connectivity. The mobile communication system comprises a first base station configured to establish an RRC connection with a user terminal; a second base station capable of providing an additional radio resource to the user terminal; and the network apparatus connected to each of the first base station and the second base station. The network apparatus includes a controller configured to execute: a first process of collecting operation information indicating an operational status of a plurality of the second base stations; a second process of obtaining from the first base station a measurement result of a radio quality of the second base station, the measurement result being reported by the user terminal to the first base station; a third process of determining, based on the collected operation information and the obtained measurement result, the second base station to which a second base station addition request message received from the first base station is sent; a fourth process of sending the second base station addition request message to the second base station determined in the third process; and a fifth process of sending, when obtaining an acknowledgment message for the second base station addition request message from the second base station to which the second base station addition request message is sent, the acknowledgment message to the first base station.

BRIEF DESCRIPTION OF THE DRAWINGS

FIG. 2 is a block diagram of a UE according to the first embodiment.

FIG. 3 is a block diagram of an eNB according to the first embodiment.

DESCRIPTION OF THE EMBODIMENT

[Overview of Embodiments]

Figure 1:
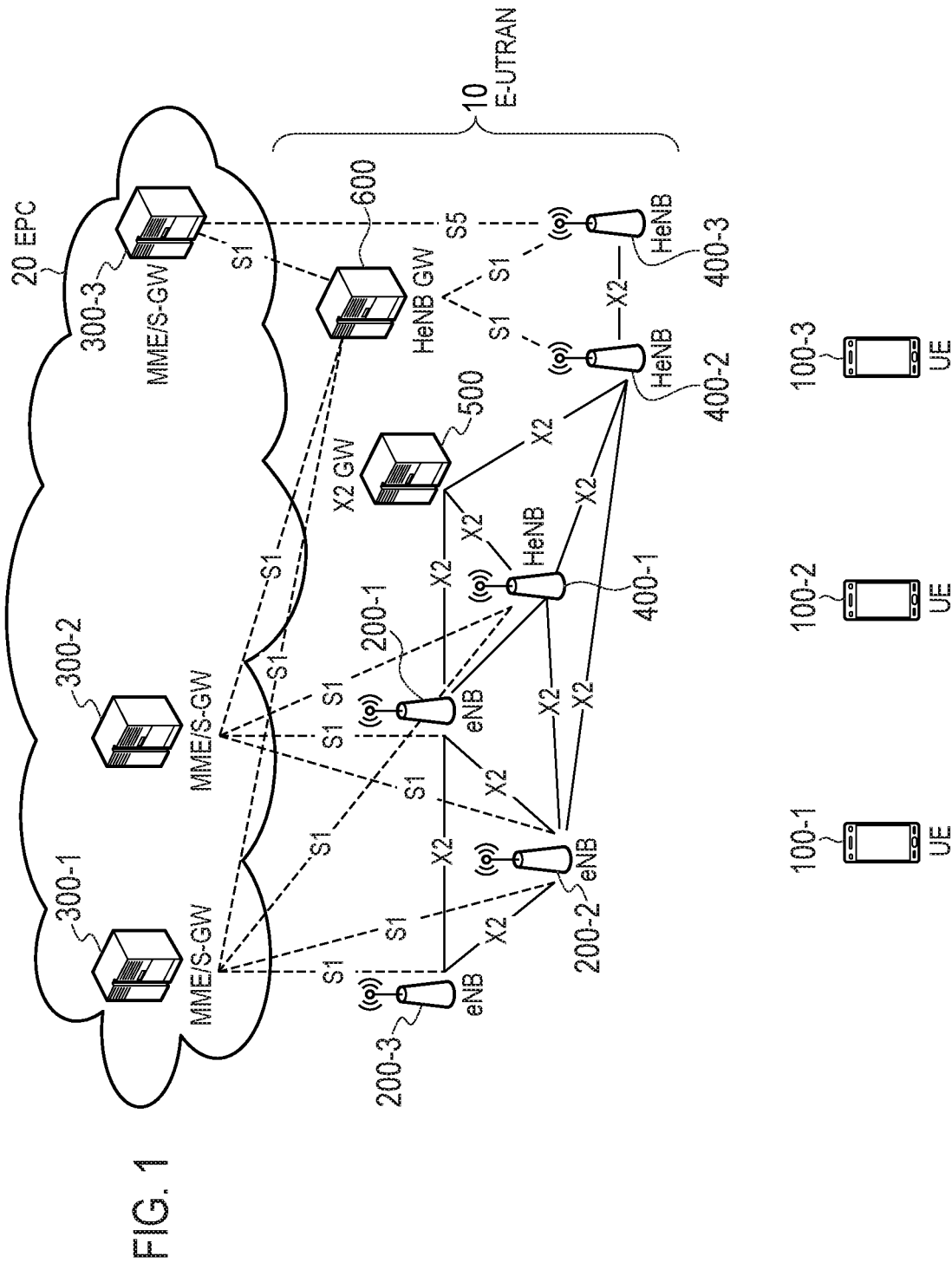
FIG. 1 is a configuration diagram of an LTE system according to a first embodiment.

In dual connectivity, it may be also possible to assume that a home base station (Home-eNB) (hereinafter, called "HeNB") is used as a secondary base station. However, a method of operating the dual connectivity when the HeNB is used as the secondary base station has not been defined.

Thus, there is a particular need of a smooth process in a case of adding the home base station as the secondary base station or the like.

Therefore, an embodiment provides a network apparatus and a base station capable of executing, in dual connectivity, a smooth process in a case of adding a home base station as a secondary base station or the like.

A network apparatus according to embodiments is used in a mobile communication system capable of executing communication by dual connectivity. The mobile communication system comprises a first base station configured to establish an RRC connection with a user terminal; a second base station capable of providing an additional radio resource to the user terminal; and the network apparatus connected to each of the first base station and the second base station. The network apparatus includes a controller configured to execute: a first process of collecting operation information indicating an operational status of a plurality of the second base stations; a second process of obtaining from the first base station a measurement result of a radio quality of the second base station, the measurement result being reported by the user terminal to the first base station; a third process of determining, based on the collected operation information and the obtained measurement result, the second base station to which a second base station addition request message received from the first base station is sent; a fourth process of sending the second base station addition request message to the second base station determined in the third process; and a fifth process of sending, when obtaining an acknowledgment message for the second base station addition request message from the second base station to which the second base station addition request message is sent, the acknowledgment message to the first base station.

In one embodiment, if capable of collecting the operation information of the plurality of second base stations in the first process, the controller sets a priority order for each of the second base stations corresponding to the collected operation information, and executes the third process from the second base station having a higher priority order.

In one embodiment, the controller continues the third process, based on the priority order, until receiving the acknowledgment message from the second base station.

In one embodiment, if determining a plurality of the second base stations in the third process, the controller sends the second base station addition request message all at once to the plurality of determined second base stations in the fourth process. If obtaining the acknowledgment message from each of the plurality of second base stations in the fifth process, the controller selects, based on the collected operation information, the second base station being a target which sends the acknowledgment message to the first base station, from the plurality of second base stations. The controller sends to the first base station the acknowledgment message about the selected second base station.

In one embodiment, the controller stores the operation information of the second base station collected in the first process and further executes a process of sending the operation information to the first base station.

In one embodiment, the operation information is information about a load of the second base station or information indicating an operation mode of the second base station.

In one embodiment, the information about the load of the second base station is at least one piece of information of: the number of user terminals that can be accommodated by the second base station; the number of user terminals presently connected to the second base station; the number of radio resource blocks used in the second base station; and a load level of hardware of the second base station.

In one embodiment, the second base station is a home base station. The information indicating the operation mode of the second base station indicates which mode, a hybrid mode, a closed mode, or an open mode, the operation mode of the second base station is.

A first base station according to one embodiment is used in a mobile communication system capable of executing communication by dual connectivity. The mobile communication system comprises the first base station configured to establish an RRC connection with a user terminal; a second base station capable of providing an additional radio resource to the user terminal; and the network apparatus connected to each of the first base station and the second base station. The first base station comprises a controller configured to execute: a first process of obtaining a measurement result of a radio quality of the second base station from the user terminal; a second process of transmitting, if obtaining a measurement result of a radio quality of the second base station, a second base station addition request message including the measurement result, to the network apparatus; a third process of receiving an acknowledgment message of the second base station for the second base station addition request message from the network apparatus; and a fourth process of transmitting, to the user terminal, configuration information for the dual connectivity using the second base station from which the acknowledgment message is transmitted.

The controller of the first base station according to one embodiment obtains, via the network apparatus, operation information indicating an operational status of a plurality of the second base stations. The controller sets, when the first base station sends a second base station addition request message, a priority order of the second base station to which the second base station addition request message is sent, based on the obtained operation information and the measurement result.

The controller of the first base station according to another embodiment obtains, via the network apparatus, operation information indicating an operational status of a plurality of the second base stations. The controller determines, based on the obtained operation information and the measurement result, whether or not to transmit the second base station addition request message to the network apparatus. The controller executes, if determining to transmit the second base station request message, the second process.

In one embodiment and another embodiment, the operation information is information about a load of the second base station or information indicating an operation mode of the second base station.

In one embodiment and another embodiment, the information about the load of the second base station is at least one piece of information of: the number of user terminals presently connected to the second base station; the number of user terminals that can be accommodated by the second base station; the number of radio resource blocks used in the second base station; and a load level of hardware of the second base station.

In one embodiment and another embodiment, the second base station is a home base station. The information indicating the operation mode of the second base station indicates which mode, a hybrid mode, a closed mode, or an open mode, the operation mode of the second base station is.

The controller of the first base station according to another embodiment obtains, in the first process, a CSG (Closed Subscriber Group) cell identifier as well as the measurement result from the user terminal. In the second process, if the CSG cell identifier is included in a CSG cell identifier list previously obtained from the network apparatus, a process of transmitting the second base station addition request message to the network apparatus is executed.

A second base station according to one embodiment is used in a mobile communication system capable of executing communication by dual connectivity. The mobile communication system comprises a first base station configured to establish an RRC connection with a user terminal; the second base station capable of providing an additional radio resource to the user terminal; and the network apparatus connected to each of the first base station and the second base station. The second base station comprises a controller configured to execute: a first process of transmitting operation information indicating an operational status of the second base stations, to the network apparatus; a second process of obtaining, after transmitting the operation information, a second base station addition request message from the network apparatus; and a third process of transmitting an acknowledgment message for the second base station addition request message, to the network apparatus.

In one embodiment, the operation information is information about a load of the second base station or information indicating an operation mode of the second base station.

In one embodiment, the information about the load of the second base station is at least one piece of information of: the number of user terminals that can be accommodated by the second base station; the number of user terminals presently connected to the second base station; the number of radio resource blocks used in the second base station; and a load level of hardware of the second base station.

In one embodiment, the second base station is a home base station, and the information indicating the operation mode of the second base station indicates which mode, a hybrid mode, a closed mode, or an open mode, the operation mode of the second base station is.

[First Embodiment]

Hereinafter, the embodiment in a case where contents of the present disclosure are applied to an LTE system will be described.

(System Configuration)

FIG. 1 is a configuration diagram of an LTE system according to the first embodiment. As shown in FIG. 1, the LTE system according to the first embodiment includes UEs (User Equipments) 100, E-UTRAN (Evolved-UMTS Terrestrial Radio Access Network) 10, and EPC (Evolved Packet Core) 20.

The UE 100 corresponds to a user terminal. The UE 100 is a mobile communication apparatus and performs radio communication with a connected cell (a serving cell). The UE 100 has a function of executing radio communication with a CSG cell/hybrid cell/open cell which will be described later. Configuration of the UE 100 will be described later.

The E-UTRAN 10 corresponds to a radio access network. The E-UTRAN 10 includes eNBs 200 (evolved Node-Bs), HeNBs 400, X2-GW 500 and HeNB-GW 600. The configuration of HeNB 400 and X2-GW 500 will be described later.

The eNB 200 corresponds to, for example, a macro base station. The macro base station is a large-scale stationary radio communication apparatus installed by an operator. In the present embodiment, the eNB 200 will be described as a macro base station (MeNB). Note that the eNB 200 may be a micro base station or a pico base station which is smaller than the macro base station. The eNBs 200 are connected mutually via an X2 interface. Further, the eNBs 200 are connected to the HeNBs (Home eNB) 400 to be described later via the X2 interface. Configuration of the eNB 100 will be described later.

The eNB 200 manages a cell or a plurality of cells and performs radio communication with the UE 100 that establishes a connection with the cell of the eNB 200. The eNB 200, for example, has a radio resource management (RRM) function, a function of routing user data, and a measurement control function for mobility control and scheduling. It is noted that the "cell" is used as a term indicating a minimum unit of a radio communication area, and is also used as a term indicating a function of performing radio communication with the UE 100.

The EPC 20 corresponds to a core network. A network of the LTE system (a LTE network) is configured by the E-UTRAN 10 and the EPC 20. The EPC 20 includes MME (Mobility Management Entity)/S-GW (Serving-Gateway) 300. The MME performs various mobility controls and the like, for the UE 100. The S-GW performs control to transfer user data. The MME/S-GW 300 is connected to the eNB 200, the HeNB 400 and the like via an S1 interface.

FIG. 2 is a block diagram of the UE 100. As shown in FIG. 2, the UE 100 includes an antenna 101, a radio transceiver 110, a user interface 120, GNSS (Global Navigation Satellite System) receiver unit 130, a battery 140, a memory 150, and a processor 160. The memory 150 corresponds to a storage, and the processor 160 corresponds to a controller. The UE 100 may not have the GNSS receiver unit 130. Furthermore, the memory 150 may be integrally formed with the processor 160, and this set (that is, a chip set) may be a processor 160' constituting the controller. The controller executes various processes to be described later and various communication protocols.

The antenna 101 and the radio transceiver 110 are used to transmit and receive a radio signal. The radio transceiver 110 converts a baseband signal (a transmission signal) output from the processor 160 into the radio signal, and transmits the radio signal from the antenna 101. Furthermore, the radio transceiver 110 converts a radio signal (a reception signal) received by the antenna 101 into the baseband signal, and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The memory 150 stores a list (whitelist) of CSG-IDs indicating Closed Subscriber Group (CSG) cells connectable by the UE 100.

The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols described later.

FIG. 3 is a block diagram of the eNB 200. As shown in FIG. 3, the eNB 200 includes an antenna 201, a radio transceiver 210, a network interface 220, a memory 230, and a processor 240. It is note that the memory 230 may be integrated with the processor 240, and this set (that is, a chipset) may be a processor 240' constituting the controller.

The antenna 201 and the radio transceiver 210 are used to transmit and receive a radio signal. The radio transceiver 210 converts a baseband signal (a transmission signal) output from the processor 240 into the radio signal, and transmits the radio signal from the antenna 201. Furthermore, the radio transceiver 210 converts a radio signal (a reception signal) received by the antenna 201 into the baseband signal, and outputs the baseband signal to the processor 240.

The network interface 220 is connected to the neighbor eNB 200 and/or the HeNB 400 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The memory 230 stores information provided from the X2-GW 500 described later.

The processor 240 includes the baseband processor that performs modulation and demodulation, encoding and decoding and the like on the baseband signal and a CPU that performs various processes by executing the program stored in the memory 230. The processor 240 executes various processes and various communication protocols described later. The memory 230 stores information provided from the X2-GW 500 described later.

Figure 4:
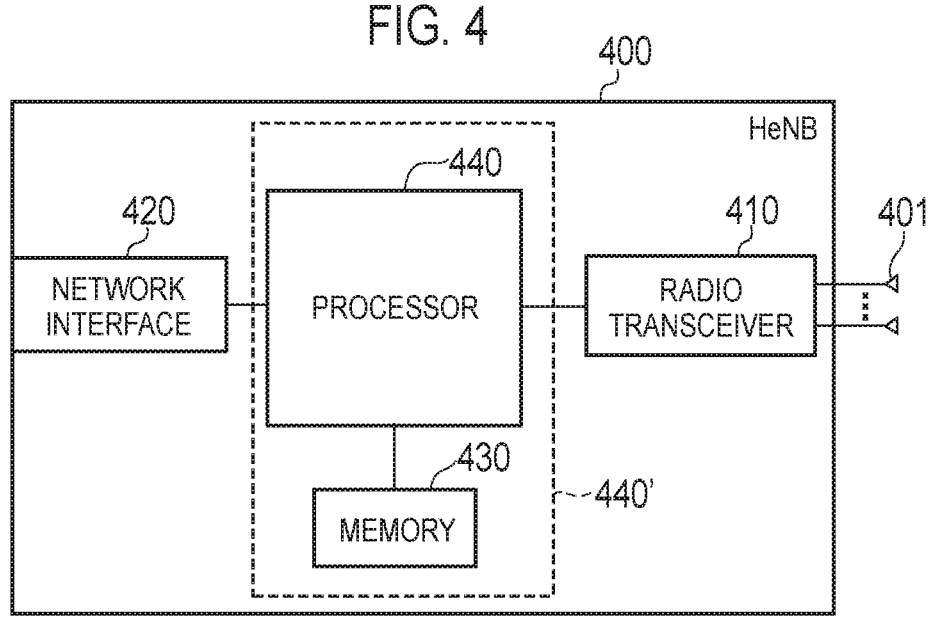
FIG. 4 is a block diagram of an HeNB according to the first embodiment.

FIG. 4 is a block diagram of the HeNB 400. The HeNB 400 is a small-scale base station used in a narrow range with a radius of a few tens of meters. The HeNB 400 may form a CSG cell, a hybrid cell, or an open cell. It is noted that the HeNB 400 configured to manage the CSG cell is called a close-mode HeNB, for example. The HeNB 400 configured to manage the hybrid cell is called a hybrid-mode HeNB. The HeNB 400 configured to manage the open cell is called an open-mode HeNB.

The HeNB 400 is a small stationary radio communication apparatus that can be installed indoors. The HeNB 400 forms a specific cell having a coverage narrower than that of the eNB 200. The specific cell is called a "CSG (Closed Subscriber Group) cell", a "hybrid cell", or an "open cell" according to a set access mode.

The CSG cell is a cell accessible only by a UE 100 (called a "member UE") having an access right, and broadcasts a CSG ID. The UE 100 holds in the memory 150 a list (called a "white list") of CSG IDs for which the UE 100 has the access right, and determines whether to have the access right, based on the white list, and the CSG ID broadcast by the CSG cell.

The hybrid cell is a cell in which the member UE is more advantageously treated as compared with a non-member UE, and broadcasts, in addition to the CSG ID, information indicating that the hybrid cell is a cell released also to the non-member UE. The UE 100 determines whether to have the access right, based on the white list and the CSG ID broadcast by the hybrid cell. The HeNB 400 configured to manage the hybrid cell may be called a hybrid-mode HeNB.

The open cell is a cell in which the UE 100 is equivalently treated regardless of whether or not the UE 100 is a member, and does not broadcast the CSG ID. In view of the UE 100, the open cell is equivalent to a macro cell.

As illustrated FIG. 4, the HeNB 400 includes an antenna 401, a radio transceiver 410, a network interface 420, a memory 430, and a processor 440 (controller). It is noted that the memory 430 may be integrated with the processor 440, and this set (that is, a chipset) may be a processor 440' (controller) included in a controller.

The antenna 401 and the radio transceiver 410 (radio transceiver unit) are used to transmit and receive a radio signal. The radio transceiver 410 converts a baseband signal (transmission signal) output from the processor 440 into a radio signal, and transmits the radio signal from the antenna 401. Furthermore, the radio transceiver 410 converts a radio signal received by the antenna 401 into a baseband signal (received signal), and outputs the baseband signal to the processor 440. The radio transceiver unit forms a CSG cell, a hybrid cell, or an open cell.

When an S1 interface passing through an HeNB-GW 600 is established with an MME/S-GW 300, the network interface 420 performs communication with the MME 300 through the HeNB GW 600. On the other hand, when an S5 interface not passing through the HeNB GW 600 is established with the MME 300, the network communication unit 420 performs direct communication with the MME 300.

The network interface 420 performs communication, via an X2 interface, with the eNB 200. Further, the network interface 420 performs communication, via the X2 interface, with an X2-GW 500.

The memory 430 stores a program executed by the processor 440 and information used for a process by the processor 440.

The processor 440 includes a baseband processor configured to perform modulation and demodulation, encoding and decoding, and the like on the baseband signal, and a CPU configured to perform various types of processes by executing the program stored in the memory 430. The processor 440 executes various types of processes and various types of communication protocols described later.

The HeNB 400 may be connected to one X2-GW 500 only. The HeNB 400 is previously set with information on an IP address of the X2-GW 500 connected by the HeNB 400, for example.

Figure 5:
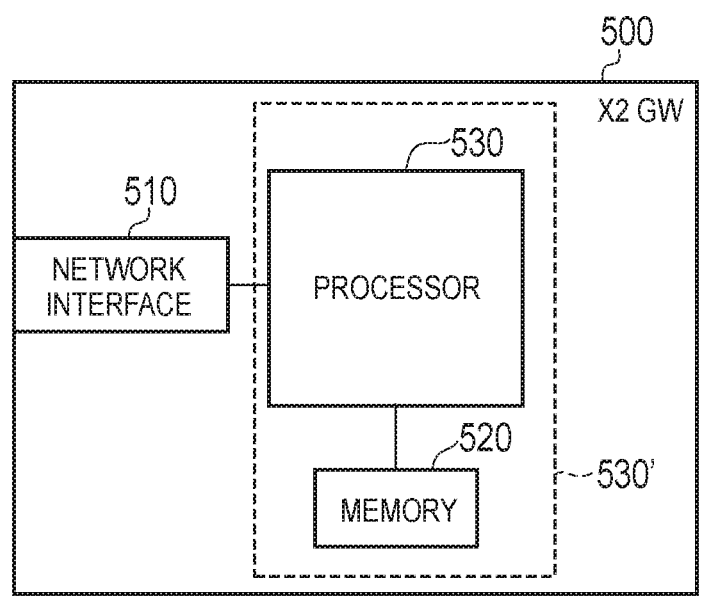
FIG. 5 is a block diagram of an X2-GW according to the first embodiment.

FIG. 5 is a block diagram of the X2-GW 500. The X2-GW 500 includes a function of an X2 Proxy server. As illustrated in FIG. 5, the X2-GW 500 includes a network interface 510, a memory 520, and a processor 530 (controller). It is noted that the memory 520 may be integrated with the processor 530, and this set (that is, a chipset) may be a processor 530' included in a controller.

The network interface 510 performs communication, via the X2 interface, with the eNB 200 or the HeNB 400.

The memory 520 stores various types of information used for control by the processor 530. In the memory 520, the eNB 200/HeNB 400 under the management of the X2-GW 500 is registered. The memory 520 stores operation information of the HeNB 400 provided by the HeNB 400 described later. The memory 520 further stores information provided by the eNB 200 described later. The information provided from the eNB 200 corresponds to a content of a Measurement report provided from the UE 100 to the eNB 200.

The processor 530 controls various types of functions provided in the X2-GW 500. The processor 530 executes various types of processes and various types of communication protocols described later.

The X2-GW 500 does not terminate an X2AP procedure excluding an X2AP message transfer procedure, but starts an X2 release procedure and an X2 error display procedure. It is noted that it may define that if collecting operation information of the HeNB 400 described later, the X2-GW 500 may start transmitting a Resource Status Request message, as in an example illustrated in FIG. 11 described later. In addition, the X2-GW 500 may be configured to execute another process not terminated by the X2-GW 500.

Figure 6:
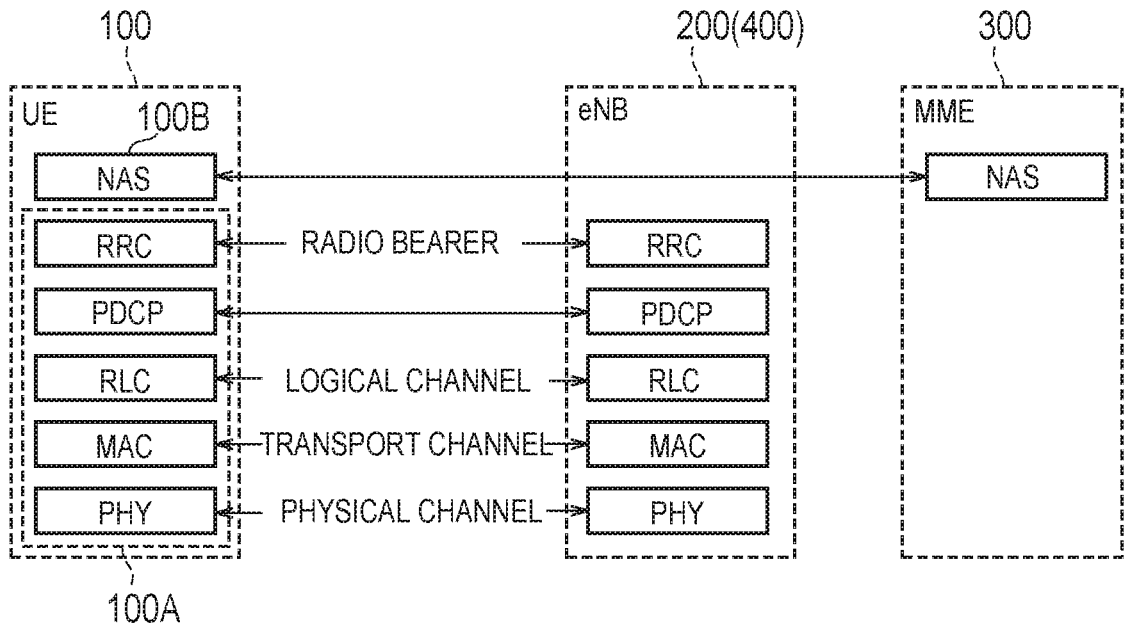
FIG. 6 is a protocol stack diagram according to the first embodiment.

FIG. 6 is a protocol stack diagram of a radio interface in the LTE system. As illustrated in FIG. 6, the radio interface protocol is classified into a layer 1 to a layer 3 of an OSI reference model, wherein the layer 1 is a physical (PHY) layer. The layer 2 includes MAC (Medium Access Control) layer, RLC (Radio Link Control) layer, and PDCP (Packet Data Convergence Protocol) layer. The layer 3 includes RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200 (HeNB 400), user data and a control signal are transmitted through the physical channel.

The MAC layer performs priority control of data, and a retransmission process and the like by hybrid ARQ (HARQ). Between the MAC layer of the UE 100 and the MAC layer of the eNB 200 (HeNB 400), user data and a control signal are transmitted via a transport channel. The MAC layer of the eNB 200 (HeNB 400) includes a transport format of an uplink and a downlink (a transport block size, a modulation and coding scheme) and a scheduler to decide (schedule) an allocated resource block to the UE 100.

The RLC layer transmits data to an RLC layer of a reception side by using the functions of the MAC layer and the PHY layer. Between the RLC layer of the UE 100 and the RLC layer of the eNB 200, user data and a control signal are transmitted via a logical channel.

The PDCP layer performs header compression and decompression, and encryption and decryption.

The RRC layer is defined only in a control plane handling a control signal. Between the RRC layer of the UE 100 and the RRC layer of the eNB 200 (HeNB 400), a control signal (an RRC message) for various types of setting is transmitted. The RRC layer controls the logical channel, the transport channel, and the physical channel in response to establishment, re-establishment, and release of a radio bearer. When a connection (an RRC connection) is established between the RRC of the UE 100 and the RRC of the eNB 200, the UE 100 is in an RRC connected state, and when the connection is not established, the UE 100 is in an RRC idle state.

NAS (Non-Access Stratum) layer positioned above the RRC layer performs session management, mobility management and the like.

In the UE 100, the physical layer or the RRC layer constitutes an AS (Access Stratum) entity 100A. The NAS layer constitutes a NAS entity 100B. The functions of the AS entity 100 A and the NAS entity 100 B are executed by the processor 160 (controller). That is, the processor 160 (controller) includes the AS entity 100A and the NAS entity 100B. In the idle mode, the AS entity 100A performs cell selection/reselection, and the NAS entity 100B performs PLMN selection.

(Dual Connectivity)

The LTE system according to the embodiment supports dual connectivity. In the dual connectivity, the UE 100 simultaneously establishes a connection with a plurality of eNBs 200. It is noted that some of the plurality of eNBs 200 may be the HeNB 400. The UE 100 is allocated, from each eNB 200 (HeNB 400), with a radio resource, and thus, it is possible to expect an improvement in throughput. It is noted that the dual connectivity may be called a carrier aggregation between eNBs (inter-eNB CA).

Figure 7:
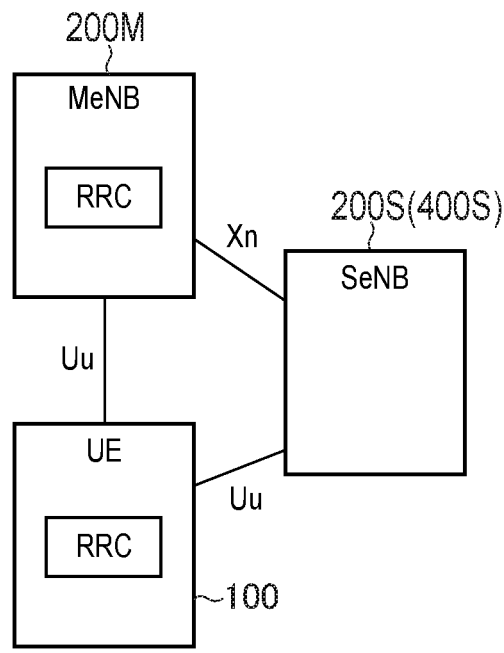
FIG. 7 is a diagram for describing an overview of dual connectivity.

FIG. 7 is a diagram for describing an overview of the dual connectivity. As illustrated in FIG. 7, in the dual connectivity, out of the plurality of eNBs 200 configured to establish a connection with the UE 100, only a master eNB (MeNB) 200M establishes an RRC connection with the UE 100. On the other hand, out of the plurality of eNBs 200, a secondary eNB (SeNB) 200S (400S) does not establish the RRC connection with the UE 100, but provides an additional radio resource to the UE 100. In other words, the MeNB 200M establishes not only a user plane connection, but also a control plane connection with the UE 100. On the other hand, the SeNB 200S (400S) establishes a user plane connection with the UE 100, without establishing a control plane connection with the UE 100. An Xn interface is set between the MeNB 200M and the SeNB 200S (400S). The Xn interface is either an X2 interface or a new interface.

In the dual connectivity, the UE 100 is capable of carrier aggregation using N cells managed by the MeNB 200M and M cells managed by the SeNB 200S (400S), simultaneously. In the dual connectivity, a maximum number of serving cells of the UE 100, that is, a maximum number of (N+M) is five, for example. Here, a group including the N cells managed by the MeNB 200M is called a master cell group (MCG). Furthermore, a group including the M cells managed by the SeNB 200S (400S) is called a secondary cell group (SCG). To the SCG, a special cell for providing a PUCCH of the UE 100 is set. The special cell executes some of functions of a primary cell (PCell) in the carrier aggregation.

Figure 8:
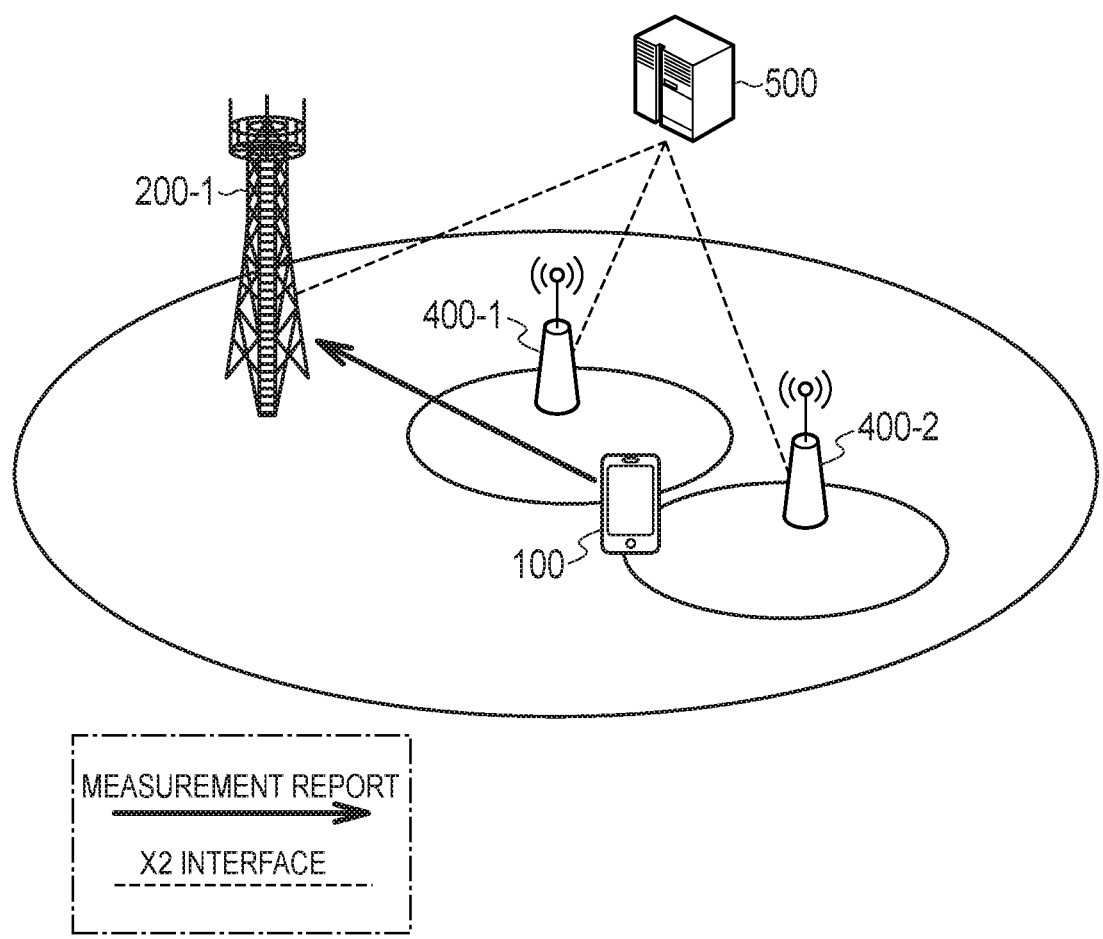
FIG. 8 is a conceptual diagram illustrating an operational status according to the first embodiment.

In the dual connectivity, the HeNB 400 can also have a function of the SeNB. In this case, as illustrated in FIG. 8, it is assumed that the HeNB 400 (corresponding to an HeNB 400-1 and an HeNB 400-2 in an example of FIG. 8) is connected to the eNB 200 (corresponding to an eNB 200-1 in an example of FIG. 8) via the X2-GW 500. It is noted that in the description following FIG. 8, for the purpose of description, the two HeNBs 400 (the HeNB 400-1 and the HeNB 400-2) are used; however, this is not limiting. If there are two or more HeNBs 400 to which the UE 100 can be connected, two or more HeNB 400 may be adopted. Hereinafter, for the purpose of illustration, the two or more HeNBs 400 are simply referred to as two HeNBs 400 (the HeNB 400-1 and the HeNB 400-2).

The allowable number of UEs 100 that can be accommodated in the HeNB 400 is two to five, for example. It is noted that if the HeNB 400 is defined as a candidate of the SeNB, the allowable number of UEs that can be accommodated may be defined to be than five. It is noted that a relationship of the allowable number of UEs 100 in each mode in the HeNB 400 is set forth, for example, as follows:

The allowable number of UEs to be accommodated in the open mode>the allowable number of UEs to be accommodated in the hybrid mode>the allowable number of UEs to be accommodated in the closed mode If the eNB 200 selects the HeNB 400 as a candidate for the SeNB, the following situation may be assumed: If the eNB 200 transmits an SeNB Addition request message toward the selected HeNB 400, the HeNB 400 receiving the SeNB Addition request message is highly likely to have a high load due to a characteristic that the number of UEs to be accommodated is smaller than another cell (a macro cell, a micro cell, and a pico cell, for example) as described above. A case in which the HeNB 400 has a high load means when the number of terminals to be accommodated in the selected HeNB 400 reaches a predetermined number, for example. If having a high load in itself, the HeNB 400 will send, to the eNB 200, a message indicating that SeNB Addition is rejected. That is, it is assumed that in a scenario where the HeNB 400 is selected as a candidate for the SeNB, there is a high probability that an SeNB Addition procedure is failed. A process or a configuration to deal with such a situation will be described, below.

(SeNB Addition Process)

With reference to FIG. 9 to FIG. 12, an operation according to the first embodiment will be described. FIG. 9 to FIG. 12 illustrate a process of determining, by the X2-GW 500, an HeNB to which an SeNB Addition request message received from the eNB 200 is sent, based on operation information indicating an operational status for a plurality of HeNBs (HeNB 400-1/HeNB 400-2), and a measurement result of a downlink radio quality of the plurality of HeNBs (HeNB 400-1/HeNB 400-2) reported from the UE 100 to the eNB 200. It is noted that in FIG. 9, the UE 100 and the MeNB 200-1 are in the RRC connected state.

Figure 9:
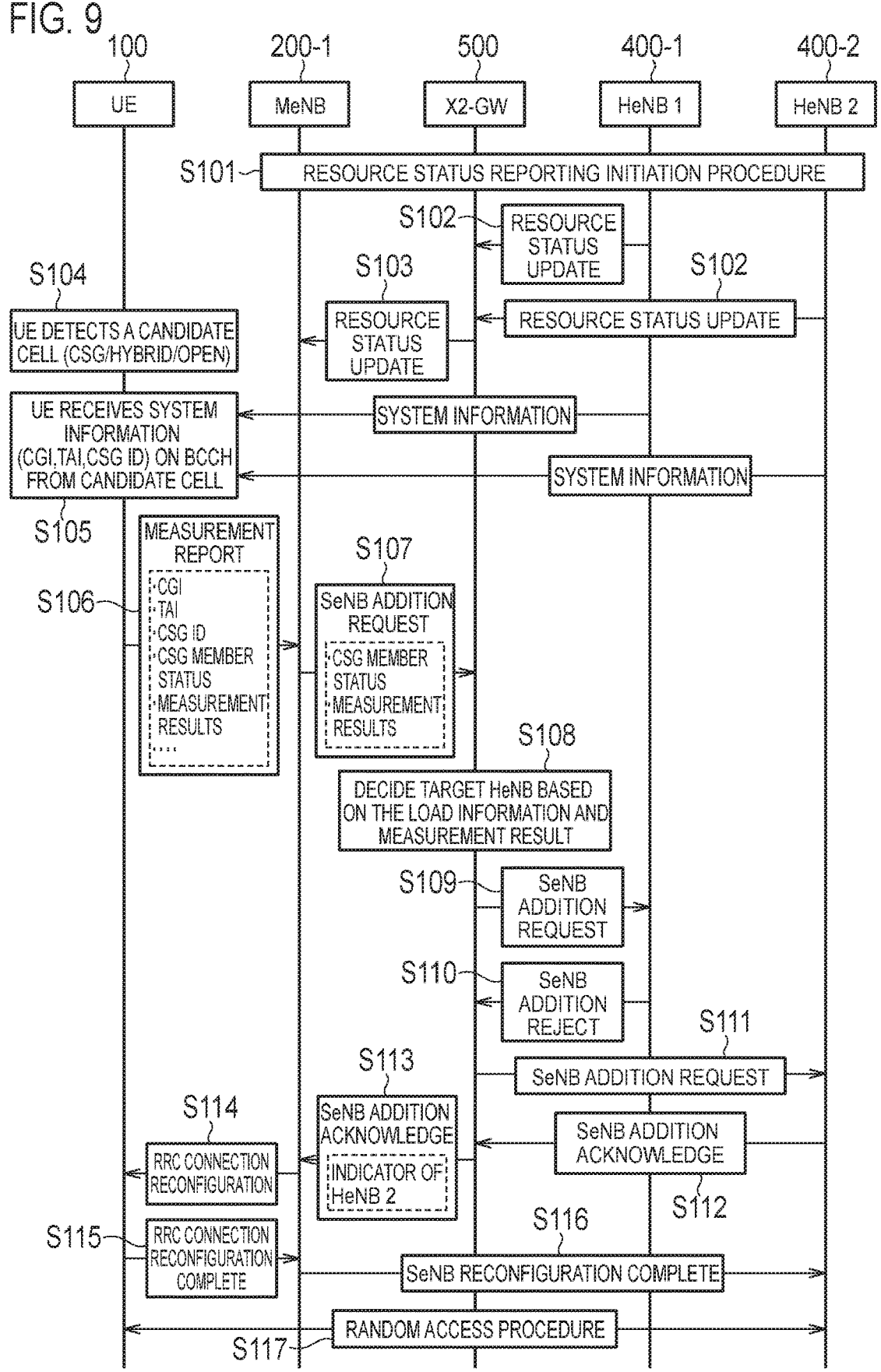
FIG. 9 is a sequence chart for describing an operation according to the first embodiment.
Figure 10:
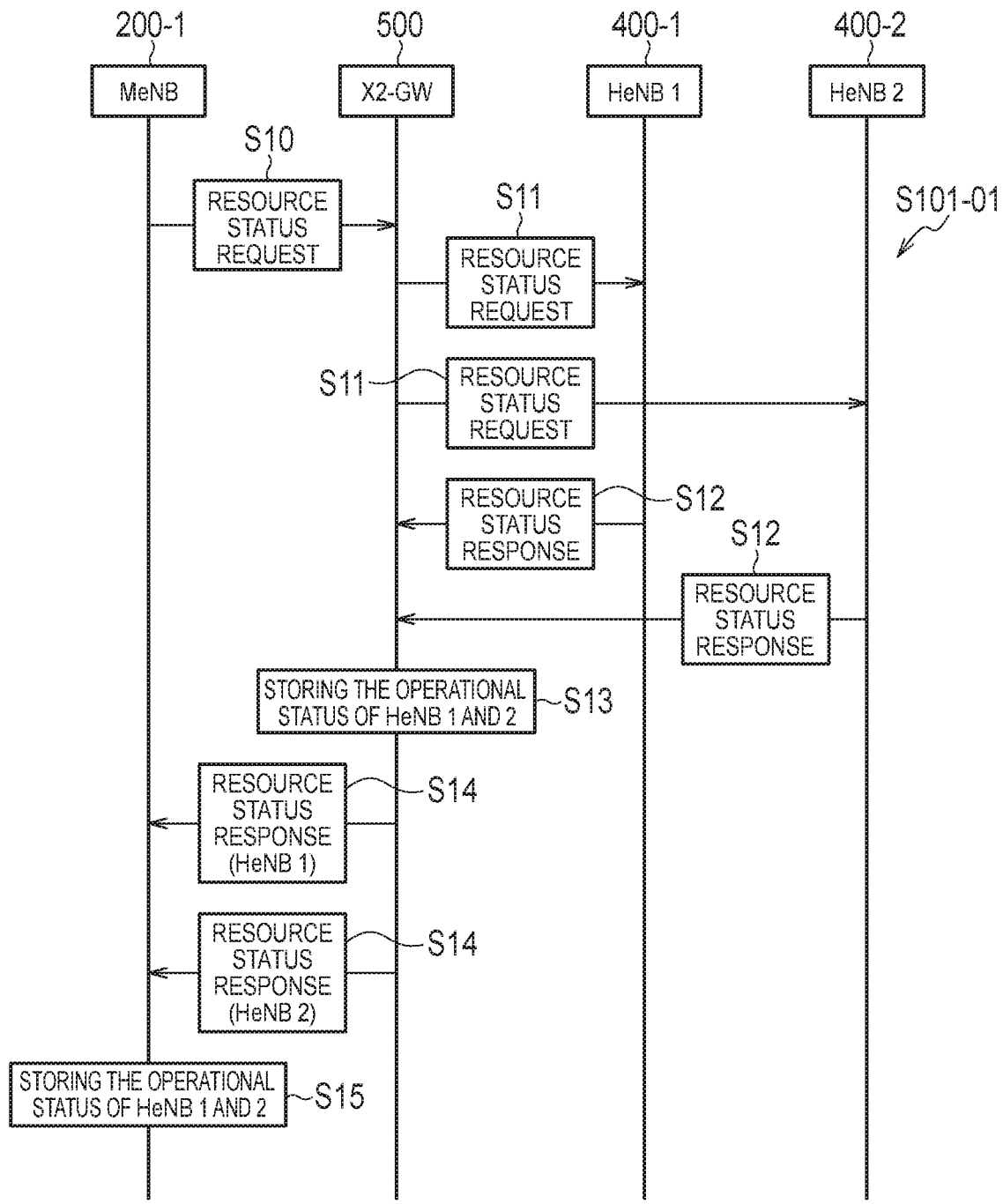
FIG. 10 is a diagram illustrating a first example of a Resource Status Reporting initiation procedure.
Figure 11:
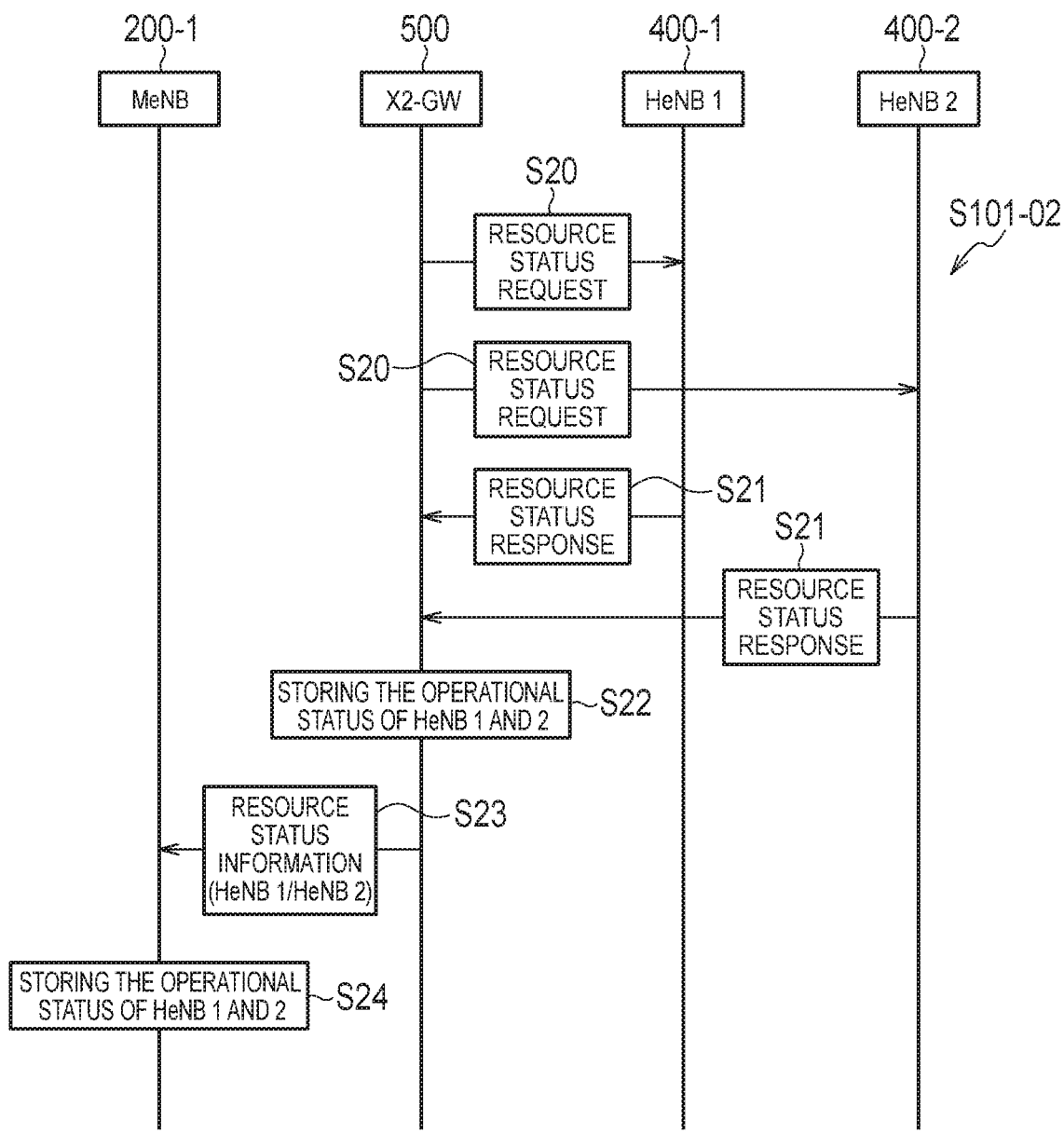
FIG. 11 is a diagram illustrating a second example of the Resource Status Reporting initiation procedure.

In FIG. 9, the X2-GW 500 collects HeNB operation information indicating an operational status in the HeNB 400-1/the HeNB 400-2, in a Resource Status Reporting Initiation procedure (step S101). Step S101 is illustrated in detail in FIG. 10 and FIG. 11. An example (S101-01) illustrated in FIG. 10 is an example where the MeNB 200-1 ("M" in this case corresponds to "macro") is a start point of a collection process of the HeNB operation information. An example (S101-02) illustrated in FIG. 11 is an example where the X2-GW 500 is a start point of the collection process of the HeNB operation information.

In an example illustrated in FIG. 10, the MeNB 200-1 is assumed to previously store a list of the CSG IDs for the UE 100 (white list), which is provided from the network apparatus (MME or the like). The MeNB 200-1 sends a Resource Status request message to the X2-GW 500 at a predetermined timing (step S10). In this case, the MeNB 200-1 transmits CSG ID identification information (CSG ID IE) indicating a CSG ID shown in the white list, into the Resource Status request message.

After obtaining the Resource Status request message, the X2-GW 500 designates an HeNB 400 to which the Resource Status request message is sent, based on CSG ID identification information included in the Resource Status request message. In the example of FIG. 10, the HeNB 400-1 and the HeNB 400-2 are designated. The X2-GW 500 sends the Resource Status request message obtained in step S10, to the designated HeNB 400-1 and HeNB 400-2 (step S11).

The HeNB 400-1 and the HeNB 400-2 obtaining the Resource Status request message each transmit a Resource Status response message including the HeNB operation information, to the X2-GW 500 (step S12). The Resource Status response message includes identification information (a cell ID or the like) for identifying an HeNB from which the message is sent. The HeNB operation information is information on the load of the HeNB 400-1 (HeNB 400-2) (first operation information) and information indicating the operation mode (second operation information). Firstly, the first operation information is at least one piece of information of the number of user terminals to be presently connected to the HeNB 400-1 (HeNB 400-2), the number of user terminals that can be accommodated in the HeNB 400-1 (HeNB 400-2), the number of radio resource blocks used in the HeNB 400-1 (HeNB 400-2), and a load level of hardware of the HeNB 400-1 (HeNB 400-2). The second operation information indicates which operation mode, the hybrid mode, the closed mode, or the open mode, the HeNB 400-1 (HeNB 400-2) is in. It is noted that the second operation information may indicate which cell, the CSG cell, the hybrid cell, or the open cell, the cell operated by the HeNB 400-1 (HeNB 400-2) is.

The X2-GW 500 stores the first operation information and the second operation information provided by the HeNB 400-1 and the first operation information and the second operation information provided by the HeNB 400-2 (step S13).

The X2-GW 500 generates the Resource Status response message including information for the HeNB 400-1 including the first operation information, the second operation information from the HeNB 400-1, and the identification information of the HeNB 400-1, and information for the HeNB 400-2 including the first operation information, the second operation information from the HeNB 400-2, and the identification information of the HeNB 400-2, and transmits the message to the MeNB 200-1 (step S14). As a result, the X2-GW 500 sends each operation information or the like collected from each of the HeNB 400-1 and the HeNB 400-2, into one Resource Status response message, to the MeNB 200-1, and thus, it is possible to simplify a transmission process from the X2-GW 500 to the MeNB 200-1. This contributes to realization of a prompt process. It is noted that the X2-GW 500 may apply, instead of such a transmission method (first method), a second method in which the Resource Status response message (including the identification information of the HeNB 400-1) including the first operation information and the second operation information from the HeNB 400-1 and the Resource Status response message (including the identification information of the HeNB 400-2) including the first operation information and the second operation information from the HeNB 400-2 are transmitted individually to the MeNB 200-1. In this case, the HeNB-GW500 may implement the above-described two methods by appropriately switching depending on an operation status in the X2-GW 500.

The MeNB 200-1 stores each of the HeNB operation information of the HeNB 400-1 and the HeNB operation information of the HeNB 400-2 provided from the X2-GW 500 in a manner to be associated with the identification information of each HeNB 400 (step S15). The MeNB 200-1 sets a priority order for a plurality of eNBs at least including the HeNB 400-1 and the HeNB 400-2, based on each HeNB operation information of the HeNB 400-1 and the HeNB 400-2 and the measurement result of the radio quality of the HeNB 400-1 and the HeNB 400-2. The priority order corresponds to a sending order of the SeNB Addition request message in a case in which the MeNB 200-1 sends the SeNB Addition request message. It is noted that the measurement result of the radio quality of the HeNB 400-1 and the HeNB 400-2 will be described later.

In an example illustrated in FIG. 11, the X2-GW 500 is assumed to previously store a list of the CSG IDs for the UE 100 (white list), which is provided from the network apparatus (MME or the like). The X2-GW 500 sends the Resource Status request message to the HeNB 400 (the HeNB 400-1 and the HeNB 400-2 in the example of FIG. 11) corresponding to the CSG ID stored in the white list, at a predetermined timing (step S20).

The HeNB 400-1 and the HeNB 400-2 obtaining the Resource Status request message each transmit a Resource Status response message including the HeNB operation information, to the X2-GW 500 (step S21). The Resource Status response message includes identification information (a cell ID or the like) for identifying an HeNB from which the message is sent. The HeNB operation information is the first operation information and the second operation information described above.

The X2-GW 500 stores the first operation information and the second operation information provided by the HeNB 400-1 and the first operation information and the second operation information provided by the HeNB 400-2 (step S22).

The X2-GW 500 generates a Resource Status Information message including information for the HeNB 400-1 configuring the first operation information, the second operation information from the HeNB 400-1, and the identification information of the HeNB 400-1, and information for the HeNB 400-2 including the first operation information, the second operation information from the HeNB 400-2, and the identification information of the HeNB 400-2, and transmits the message to the MeNB 200-1 (step S23). It is noted that the X2-GW 500 may apply, instead of such a transmission method (first method), a second method in which the Resource Status response message (including the identification information of the HeNB 400-1) including the first operation information and the second operation information from the HeNB 400-1 and the Resource Status response message (including the identification information of the HeNB 400-2) including the first operation information and the second operation information from the HeNB 400-2 are each replaced with the Resource Status Information message, and then transmitted to the MeNB 200-1. In this case, the HeNB-GW500 may implement the above-described two methods by appropriately switching depending on an operation status in the X2-GW 500.

The MeNB 200-1 stores each of the HeNB operation information of the HeNB 400-1 and the HeNB operation information of the HeNB 400-2 provided from the X2-GW 500 in a manner to be associated with the identification information of each HeNB 400 (step S24). Similarly to the example illustrated in FIG. 10, the MeNB 200-1 sets a priority order for a plurality of eNBs at least including the HeNB 400-1 and the HeNB 400-2, based on the HeNB operation information of the HeNB 400-1/HeNB operation information of the HeNB 400-2 and the measurement result of the radio quality of the HeNB 400-1 and the HeNB 400-2.

Next, the operation description illustrated in FIG. 9 will be resumed. In FIG. 9, after step S101, if capable of obtaining, at a predetermined timing, a Resource Status Update message including the above-described HeNB operation information (updated first operation information) from each of the HeNB 400-1 and the HeNB 400-2 (step S102), the X2-GW 500 stores the HeNB operation information (updated first operation information) included in the Resource Status Update message while overwriting the information on the first operation information stored already at the stage of the forgoing step S101. Further, the X2-GW 500 transmits to the MeNB 200-1 the Resource Status Update message including the HeNB operation information of the HeNB 400-1 and the HeNB operation information of the HeNB 400-2 obtained in step S102 (step S103). Further, in FIG. 9, the Resource Status Update message transmitted from the X2-GW 500 is described as one message; however, the Resource Status Update message from the HeNB 400-1 and the Resource Status Update message from the HeNB 400-2 may be each transmitted to the MeNB 200-1.

Each HeNB operation information (updated first operation information) of the HeNB 400-1 and the HeNB 400-2 provided from the X2-GW 500 to the MeNB 200-1 in step S103 is overwritten to be stored in the MeNB 200-1. Each of the overwritten HeNB operation information of the HeNB 400-1 and HeNB 400-2 is then utilized in the above-described setting of the priority order in the MeNB 200-1.

Independently from the processes of step S101 to step S103 (processes at a backhaul side), the UE 100 executes step S104. Herein, it is assumed that the UE 100 previously stores the white list for the CSG (CSG ID list) in the memory 150. Step S104 is a process of detecting, by the UE 100, a synchronization signal from a candidate cell (including the HeNB 400-1 and the HeNB 400-2 in the example of FIG. 9) that is a candidate for the SeNB. The candidate cell is at least any one of the CSG cell, the hybrid cell, and the open cell. It is noted that the candidate cell may be set according to an operation policy of a communication system. Firstly, upon receiving a synchronization signal, the UE 100 designates PCI from the received synchronization signal (a primary synchronization signal and a secondary synchronization signal). At this stage, the UE 100 does not understand whether a cell from which the synchronization signal is sent is the CSG cell, the hybrid cell, or the open cell. Next, the UE 100 receives a PBCH (Physical Broadcast Channel) to obtain an MIB (Master Information Block) included in the PBCH. Then, the UE 100 obtains System information (System Information Block Type 1) broadcast by PDSCH (Physical Broadcast Channel) from the candidate cell (step S105). In the example of FIG. 9, the UE 100 obtains the System information from the HeNB 400-1 and the HeNB 400-2.

In step S105, after obtaining the System information from the HeNB 400-1 and the HeNB 400-2, the UE 100 understands, from predetermined information included in the System information, whether a cell (candidate cell) configured to manage the HeNB 400-1/HeNB 400-2 is the CSG cell, the hybrid cell, or the open cell. The predetermined information includes a CGI (Cell Global Identity), a TAI (Tracking Area Identity), a CSG ID (the CSG ID indicating the HeNB 400-1 from the HeNB 400-1/the CSG ID indicating the HeNB 400-2 from the HeNB 400-2), or the like. It is noted that the CGI is an identifier for uniquely identifying a cell in the world. The TAI indicates an area unit in which a UE performs a location registration, and is configured by one or more cells. If a CSG ID is included in the System information, the UE 100 understands that a cell managed by the HeNB 400-1/HeNB 400-2 is at least either a CSG cell or a hybrid cell. It is noted that if information (1-bit information) indicating a cell released even to a user not belonging to the CSG, as well as a CSG ID are included in the System information, the UE 100 understands that a cell managed by the HeNB 400-1/HeNB 400-2 is a hybrid cell. Further, even if the System information includes a CSG ID, but not information indicating a cell released even to a user not belonging to a CSG, the UE 100 understands that a cell managed by the HeNB 400-1/HeNB 400-2 is a CSG cell. If a CSG ID is not included in the System information, the UE 100 understands that a cell managed by the HeNB 400-1/HeNB 400-2 is an open cell. In the example of FIG. 9, description proceeds with an assumption that the candidate cell is a CSG cell and/or a hybrid cell. It is noted that if the candidate cell is an open cell, a predetermined process is executed based on information excluding information related to a CSG ID described later.

After obtaining the System information from the HeNB 400-1/HeNB 400-2, upon a predetermined condition applied during a handover process, for example, being satisfied, the UE 100 starts measuring the radio quality (RSRP or the like) for the HeNB 400-1 and the HeNB 400-2. If capable of measuring the radio quality at least for the HeNB 400-1 and the HeNB 400-2, the UE 100 creates a measurement report to report the measurement result to the MeNB 200-1.

The measurement report includes the CGI and the TAI obtained from the HeNB 400-1/HeNB 400-2, the CSG ID for the HeNB 400-1/HeNB 400-2, a CSG member status for the HeNB 400-1/HeNB 400-2, and the measurement result of the radio quality of the HeNB 400-1/HeNB 400-2. The CSG member status is information indicating whether or not the UE 100 belongs to the CSG. The UE 100 transmits the created measurement report to the MeNB 200-1 (step S106). The MeNB 200-1 obtains the measurement report from the UE 100 (step S106). The MeNB 200-1 executes a process illustrated in FIG. 12.

Figure 12:
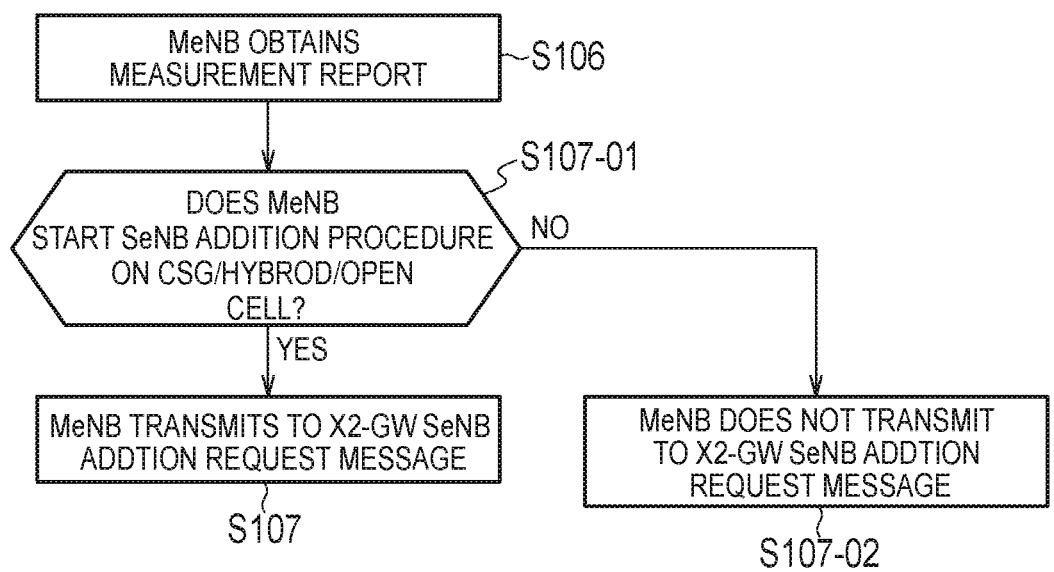
FIG. 12 is a sequence chart for describing an operation of an MeNB.

In FIG. 12, upon obtaining the measurement report (step S106), the MeNB 200-1 determines whether to start an SeNB Addition process on the CSG cell/hybrid cell (step S107-1). Step S107-1 is performed by confirming, by the MeNB 200-1, whether each CSG ID for the HeNB 400-1 and the HeNB 400-2 included in the measurement report is included in the list (white list) of the CSG IDs previously stored in the MeNB.

In step S107-1, if understanding that the CSG ID for the HeNB 400-1 and the HeNB 400-2 is included in the previously stored white list, the MeNB 200-1 determines to start an SeNB Addition process on the CSG cell/hybrid cell. In this case, the MeNB 200-1 sends the SeNB Addition request message to the X2-GW 500 (step S107). The SeNB Addition request message includes the CSG member status for the HeNB 400-1/HeNB 400-2 and the measurement result of the radio quality of the HeNB 400-1/HeNB 400-2, as illustrated in FIG. 9. The CSG member status and the measurement result of the radio quality are information included in the measurement report in step S106. When sending the SeNB Addition request message to the X2-GW 500, the MeNB 200-1 sets the X2-GW to a sending destination, but does not set the HeNB 400 ahead of the X2-GW, to the sending destination. That is, the MeNB 200-1 does not determine an HeNB 400 to which the SeNB Addition request message is sent. As a result, it is possible to reduce a process load on the MeNB 200-1.

In step S107-1, if the CSG ID for the HeNB 400-1/HeNB 400-2 is not included in the previously stored white list, the MeNB 200-1 does not send the SeNB Addition request message to the X2-GW 500 (step S107-2).

It is noted that in step S107-01, the MeNB 200-1 may adopt the following method (second method) instead of the previously described method. In the second method, in step S14 illustrated in FIG. 10 (step S23 illustrated in FIG. 11), if having been capable of obtaining the above-described second operation information about the HeNB 400-1/HeNB 400-2 from the X2-GW, the MeNB 200-1 starts the SeNB Addition process, based on the second operation information. This process is executed according to an operation policy of the MeNB 200-1. For example, if desiring an HeNB at least in the hybrid mode as a candidate for the SeNB, in terms of operation, the MeNB 200-1 starts the SeNB Addition process when part or all of the second operation information about the HeNB 400-1/HeNB 400-2 is the hybrid mode. On the other hand, if desiring an HeNB at least in the closed mode as a candidate for the SeNB, in terms of operation, the MeNB 200-1 starts the SeNB Addition process when part or all of the second operation information about the HeNB 400-1/HeNB 400-2 is the closed mode.

Next, the operation description illustrated in FIG. 9 will be resumed. In FIG. 9, if obtaining the SeNB Addition request message from the MeNB 200-1 in step S107, the X2-GW 500 executes step S108. In step S108, based on the HeNB operation information (first operation information) about the HeNB 400-1/HeNB 400-2 stored and obtained in step S101 and step S102 and the measurement result of the radio quality of the HeNB 400-1/HeNB 400-2 included in the SeNB Addition request message, the X2-GW 500 determines an HeNB 400 to which the SeNB Addition request message received from the MeNB 200-1 is sent. In this case, the X2-GW 500 sets a priority order for each of HeNBs 400 (HeNB 400-1/HeNB 400-2) corresponding to the HeNB operation information (first operation information).

The priority order is set according to a policy shown below, for example.

(1) A higher priority order will be assigned to an HeNB having a relatively better radio quality than other HeNBs and a larger number of UEs to be accommodated.

(2) A higher priority order will be assigned to an HeNB having a relatively better radio quality than other HeNBs and a fewer number of presently connected UEs.

(3) A higher priority order will be assigned to an HeNB having a relatively better radio quality than other HeNBs and a fewer number of radio resource blocks used.

(4) A higher priority order will be assigned to an HeNB having a relatively better radio quality than other HeNBs and a smaller load level of hardware.

It is noted that the policies (1) to (4) may be combined and applied.

The X2-GW 500 transmits the SeNB Addition request message from an HeNB 400 having a higher priority order (in FIG. 9, the HeNB 400-1), according to the set priority order (step S109).

If obtaining an SeNB Addition rejection message (including the identification information {cell ID or the like} of the HeNB 400-1) from the HeNB 400-1 to which the SeNB Addition request message is sent (step S110), the X2-GW 500 transmits the SeNB Addition request message to an HeNB 400 (in FIG. 9, the HeNB 400-2) having a next priority order, according to the priority order (step S110). If obtaining an SeNB Addition acknowledge message (including the identification information {cell ID or the like} of the HeNB 400-2) from the HeNB 400-2 to which the SeNB Addition request message is sent (step S112), the X2-GW 500 stops the process of transmitting the SeNB Addition request message. That is, until receiving the SeNB Addition acknowledge message from the HeNB 400-2 to which the SeNB Addition request message is sent, the X2-GW 500 continues the process of transmitting the SeNB Addition request message, based on the priority order. It is noted that if receiving a NACK having a constant threshold value or more from the HeNB 400-2 to which the eNB Addition request message is sent, the X2-GW 500 may transmit an SeNB Addition Failure message to the MeNB 200-1. A method of setting a threshold value in this case may be set in view of Latency requiring for the SeNB Addition operation or a movement speed of UE 100 if it is possible to obtain a movement speed of the UE 100 from the MeNB 200-1, or the like.

Upon receiving the SeNB Addition acknowledge message from the HeNB 400-2 (step S112), the X2-GW 500 sends the SeNB Addition acknowledge message to the MeNB 200-1 (step S113).

Upon obtaining the SeNB Addition acknowledge message from the X2-GW 500, the MeNB 200-1 sends to the UE 100 an RRC Connection Reconfiguration message including the CSG ID for the HeNB 400-2 that is a candidate for the SeNB (step S114).

Upon obtaining the RRC Connection Reconfiguration message from the MeNB 200-1, the UE 100 executes setting for the SeNB in the UE 100. After the setting is complete, the UE 100 transmits to the MeNB 200-1 an RRC Connection Reconfiguration Complete message (step S115).

Upon obtaining the RRC Connection Reconfiguration Complete message from the UE 100, the MeNB 200-1 transmits an SeNB Reconfiguration complete message, via the X2-GW 500, to the HeNB 400-2 (step S116). It is noted that if the X2 interface is established with the HeNB 400-2, the MeNB 200-1 may directly transmit the RRC Connection Reconfiguration Complete message, via the X2 interface, to the HeNB 400-2 without passing through the X2-GW 500.

Upon completion of the above processes, a Random Access process is executed between the UE 100 and the HeNB 400-2 (step S117). As a result, the UE 100 can execute communication according the dual connectivity in which the MeNB 200-1 is a master base station and the HeNB 400-2 is a secondary base station.

(Summary of First Embodiment)

In the above-described first embodiment, the X2-GW 500 determines an HeNB 400 to which the SeNB Addition request message is sent, based on the HeNB operation information (first operation information) about the HeNB 400-1/HeNB 400-2 and the measurement result of the radio quality of the HeNB 400-1/HeNB 400-2. That is, for the UE 100, the X2-GW 500 can determine an appropriate HeNB 400 as the SeNB, in consideration of the operational status of the HeNB 400 or the radio quality thereof. As a result, it is possible to avoid a situation where in the scenario where an HeNB 400 is selected as a candidate for the SeNB, there is a high probability that the SeNB Addition procedure is failed. Further, the X2-GW 500 can designate an appropriate SeNB for the UE 100 instead of the MeNB 200-1, it is possible to reduce a process load for the SeNB Addition procedure by the MeNB 200-1.

[Second Embodiment]

Next, a second embodiment will be described with reference to FIG. 13 and FIG. 14. The second embodiment will be mainly described for a difference from the first embodiment.

In the first embodiment, in step S108, the X2-GW 500 sets the priority order for each of the HeNBs 400 (HeNB 400-1/HeNB 400-2) corresponding to the HeNB operation information (first operation information), and successively transmits the SeNB Addition request message from an HeHB 400 having a higher priority order; however, in the second embodiment, the SeNB Addition request message is simultaneously transmitted all at once to the HeNBs 400 (in FIG. 13 and FIG. 14, the HeNB 400-1 and the HeNB 400-2) having the top to a predetermined order of the priority order (S109A). It is noted that without setting the priority order at the stage of step S108, the X2-GW 500 may simultaneously transmit the SeNB Addition request message all at once to all the HeNBs 400 corresponding to the HeNB operation information (first operation information).

Figure 13:
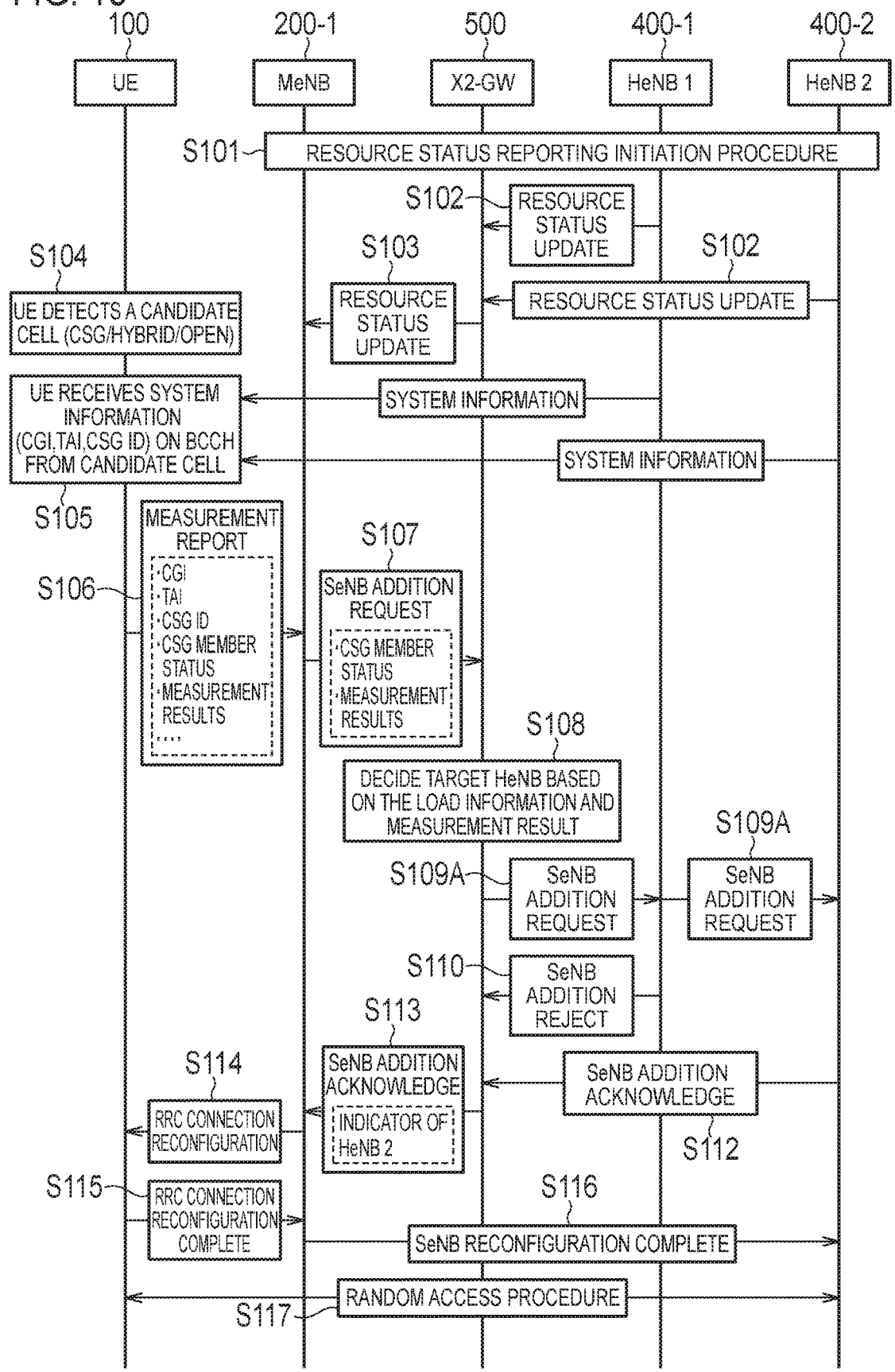
FIG. 13 is a sequence chart for describing an operation according to a second embodiment.
Figure 14:
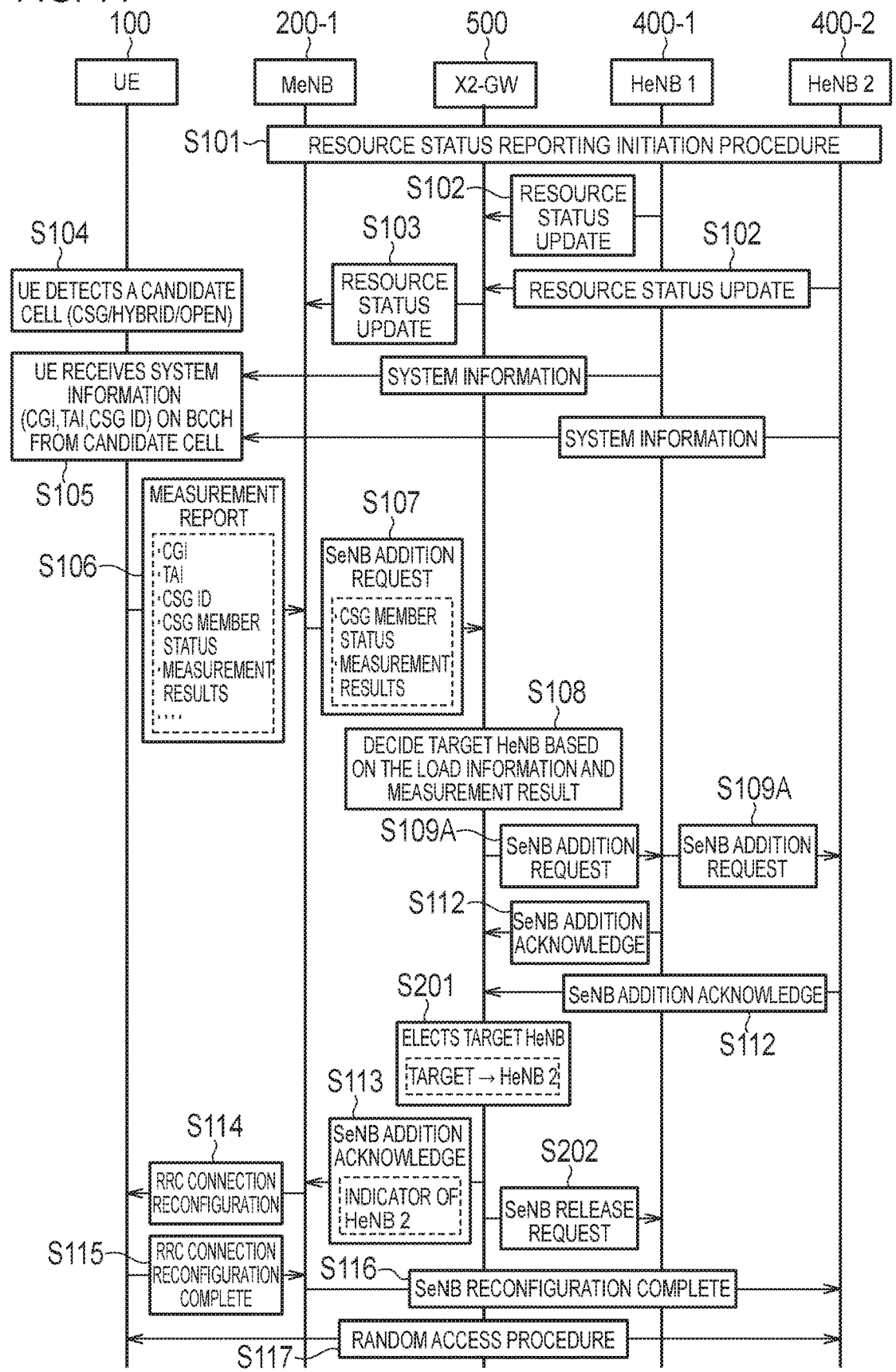
FIG. 14 is a sequence chart for describing another operation according to the second embodiment.

After the X2-GW 500 transmits the SeNB Addition request message all at once to the plurality of HeNBs 400, a process illustrated in FIG. 13 and FIG. 14 is assumed. FIG. 13 illustrates an operation when the X2-GW 500 obtains an SeNB Addition acknowledge message from one HeNB 400 (in FIG. 13, the HeNB 400-2). FIG. 14 illustrates an operation when the X2-GW 500 obtains an SeNB Addition acknowledge message from each of the plurality of HeNBs 400 (in FIG. 14, the HeNB 400-1 and the HeNB 400-2).

In FIG. 13, upon obtaining an SeNB Addition rejection message (including the identification information {cell ID or the like} of the HeNB 400-1) from the HeNB 400-1 (step S110), the X2-GW 500 does not particularly respond to the SeNB Addition rejection message. Upon obtaining an SeNB Addition acknowledge message (including the identification information {cell ID or the like} of the HeNB 400-2) from the HeNB 400-2, the X2-GW 500 sends the SeNB Addition acknowledge message to the MeNB 200-1 (step S113). A subsequent operation is similar to that in the first embodiment.

In FIG. 14, upon obtaining the SeNB Addition acknowledge message (including the identification information {cell ID or the like} of each HeNB 400) from each of the HeNB 400-1/HeNB 400-2 (step S112), the X2-GW 500 executes a process of step S201. In step S201, based on the HeNB operation information (first operation information) about the HeNB 400-1/HeNB 400-2 stored and obtained in step S101 and step S102 and the measurement result of the radio quality of the HeNB 400-1/HeNB 400-2 included in the SeNB Addition request message, the X2-GW 500 determines the SeNB Addition acknowledge message of which HeNB 400 (HeNB 400-1/HeNB 400-2) is sent to the MeNB 200-1, and elects (designates) the target HeNB 400. In FIG. 14, the HeNB 400-2 is selected. It is noted that the X2-GW 500 desirably utilizes the priority order used in step S108 when executing step S201.

In step S201, upon selecting the HeNB 400-2, the X2-GW 500 sends to the MeNB 200-1 the SeNB Addition acknowledge message (including the identification information {cell ID or the like} of the HeNB 400-2) having been obtained from the HeNB 400-2 (step S113). A subsequent operation after step S113 is similar to that in the first embodiment. On the other hand, an SeNB Release request message is sent to the HeNB 400-1 not elected in step S201 (step S202).

It is noted that in step S109A, after simultaneously transmitting the SeNB Addition request message all at once to the plurality of HeNBs 400, the X2-GW 500 may perform step S201 on the plurality of HeNBs 400 that have responded to the plurality of SeNB Addition acknowledge messages obtained during a predetermined time period. In this case, if the SeNB Addition acknowledge message is returned from only one HeNB 400 during the predetermined time period, the SeNB Addition acknowledge message may be sent to the MeNB 200-1.

(Summary of Second Embodiment)

In the second embodiment, similarly to the first embodiment, it is possible to avoid a situation where in the scenario where the HeNB 400 is selected as a candidate for the SeNB, there is a high probability that the SeNB Addition procedure is failed. Further, the X2-GW 500 can designate an appropriate SeNB for the UE 100 instead of the MeNB 200-1, it is possible to reduce a process load for the SeNB Addition procedure by the MeNB 200-1.

[Other Embodiments]

In each of the above-described embodiments, the X2-GW 500 designates an appropriate SeNB for the UE 100, instead of the MeNB 200-1; however, a network apparatus (such as an MME and an HeNB-GW) other than the X2-GW 500 may designate.

In the above-described embodiment, although the LTE system is described as an example of the mobile communication system, it is not limited to the LTE system, and the present application may be applied to a system other than the LTE system.

[Cross Reference]

The entire content of Japanese Patent Application No. 2015-100130 (filed on May 15, 2015) is incorporated in the present specification by reference.

INDUSTRIAL APPLICABILITY

The present application is useful in the field of communication.

The invention claimed is:

1. A network apparatus communicated to a first base station and a plurality of second base stations, the network apparatus comprising:
    a processor and a memory communicatively coupled to the processor, the processor configured to execute:
        a first process of collecting operation information indicating operational status of at least one of the plurality of second base stations, each of the plurality of second base stations being capable of providing an additional radio resource to a user terminal in a dual connectivity manner in which the first base station establishes an RRC connection with the user terminal, the user terminal configured to perform communication simultaneously with both the first base station and one of the plurality of second base stations in the dual connectivity manner;
        a second process of obtaining from the first base station a measurement result of a radio quality of at least one of the plurality of second base stations, the measurement result being reported by the user terminal to the first base station;
        a third process of determining, based on the collected operation information and the obtained measurement result, one second base station among the plurality of second base stations to which a second base station addition request message received from the first base station is sent;
        a fourth process of sending the second base station addition request message to the second base station determined in the third process;

a fifth process of sending, when obtaining an acknowledgment message for the second base station addition request message from the second base station to which the second base station addition request message is sent, the acknowledgment message to the first base station, wherein if capable of collecting the operation information of the plurality of second base stations in the first process, the processor sets a priority order for each of the second base stations corresponding to the collected operation information, and executes the third process from the second base station having a higher priority order.

2. The network apparatus according to claim 1, wherein the processor continues the third process, based on the priority order, until receiving the acknowledgment message from the second base station.

3. A network apparatus communicated to a first base station and a plurality of second base stations, the network apparatus comprising:
a processer and a memory communicatively coupled to the processor, the processor configured to execute:
a first process of collecting operation information indicating operational status of at least one of the plurality of second base stations, each of the plurality of second base stations being capable of providing an additional radio resource to a user terminal in a dual connectivity manner in which the first base station establishes an RRC connection with the user terminal, the user terminal configured to perform communication simultaneously with both the first base station and one of the plurality of second base stations in the dual connectivity manner;
a second process of obtaining from the first base station a measurement result of a radio quality of at least one of the plurality of second base stations, the measurement result being reported by the user terminal to the first base station;
a third process of determining, based on the collected operation information and the obtained measurement result, one second base station among the plurality of second base stations to which a second base station addition request message received from the first base station is sent;
a fourth process of sending the second base station addition request message to the second base station determined in the third process;
a fifth process of sending, when obtaining an acknowledgment message for the second base station addition request message from the second base station to which the second base station addition request message is sent, the acknowledgment message to the first base station, wherein if determining two or more second base stations in the third process, the processor sends the second base station addition request message all at once to the determined two or more second base stations in the fourth process, if obtaining the acknowledgment message from each of the two or more second base stations in the fifth process, the processor selects, based on the collected operation information, the second base station being a target which sends the acknowledgment message to the first base station, from the two or more second base stations, and the processor sends to the first base station the acknowledgment message about the selected second base station.

4. The network apparatus according to claim 1, wherein the processor stores the operation information of the second base station collected in the first process and further executes a process of sending the operation information to the first base station.

5. The network apparatus according to claim 1, wherein the operation information is information about a load of the second base station or information indicating an operation mode of the second base station.

6. The network apparatus according to claim 5, wherein the information about the load of the second base station is at least one piece of information of: the number of user terminals that can be accommodated by the second base station; the number of user terminals presently connected to the second base station; the number of radio resource blocks used in the second base station; and a load level of hardware of the second base station.

7. The network apparatus according to claim 5, wherein the second base station is a home base station, and the information indicating the operation mode of the second base station indicates which of a hybrid mode, a closed mode, and an open mode, the second base station is operating in.

8. A first base station communicated to a network apparatus, the first base station configured to establish an RRC connection with a user terminal in a dual connectivity manner, wherein
the first base station comprises:
a processor and a memory communicatively coupled to the processor, the processor configured to execute:
a first process of obtaining a measurement result of a radio quality of a second base station from the user terminal, the second base station being capable of providing an additional radio resource to the user terminal in the dual connectivity manner, the user terminal configured to perform communication simultaneously with both the first base station and the second base stations in the dual connectivity manner;
a second process of transmitting, if obtaining the measurement result of the radio quality of the second base station, a second base station addition request message including the measurement result, to the network apparatus;
a third process of receiving an acknowledgment message of the second base station for the second base station addition request message from the network apparatus; and
a fourth process of transmitting, to the user terminal, configuration information for the dual connectivity using the second base station from which the acknowledgment message is transmitted, wherein
the processor obtains, via the network apparatus, operation information indicating an operational status of a plurality of second base stations, and
the processor sets, when the first base station sends the second base station addition request message, a priority order of the second base station to which the second base station addition request message is sent, based on the obtained operation information and the measurement result.

9. The first base station according to claim 8, wherein the processor determines, based on the obtained operation information and the measurement result, whether or not to transmit the second base station addition request message to the network apparatus, and the processor executes, if determining to transmit the second base station request message, the second process.

10. The first base station according to claim 8, wherein the operation information is information about a load of the second base station or information indicating an operation mode of the second base station.

11. The first base station according to claim 10, wherein the information about the load of the second base station is at least one piece of information of: the number of user terminals presently connected to the second base station; the number of user terminals that can be accommodated by the second base station; the number of radio resource blocks used in the second base station; and a load level of hardware of the second base station.

12. The first base station according to claim 11, wherein the second base station is a home base station, and the information indicating the operation mode of the second base station indicates which of a hybrid mode, a closed mode, and an open mode the second base station is operating in.

13. The first base station according to claim 8, wherein the processor obtains, in the first process, a CSG (Closed Subscriber Group) cell identifier as well as the measurement result from the user terminal, and in the second process, if the CSG cell identifier is included in a CSG cell identifier list previously obtained from the network apparatus, the process of transmitting the second base station addition request message to the network apparatus is executed.

* * * * *